United States Patent Office 3,278,510
Patented Oct. 11, 1966

3,278,510
STABLE CATALYST SYSTEMS FOR HIGHLY CRYSTALLINE ALPHA OLEFIN POLYMERS
Arthur K. Ingberman, Somerville, N.J., assignor to Union Carbide Corporation, a corporation of New York
No Drawing. Filed Jan. 28, 1963, Ser. No. 254,404
15 Claims. (Cl. 260—93.7)

This application is a continuation-in-part of my United States application Serial No. 132,578, filed August 21, 1961, now U.S. Patent 3,179,604.

This invention relates to organo-metallic olefin catalyst systems characterized by exceptional retention of catalytic properties and a surprising ability to produce highly crystalline alpha olefin polymers substantially completely free of wholly amorphous fractions and method for preparing such catalysts. The invention further relates to the production of highly crystalline polymers of alpha olefinically unsaturated hydrocarbons by the low pressure process employing novel, highly stable organo-metallic olefin catalyst systems.

K. Ziegler has described the preparation of high molecular weight polymers of olefinically unsaturated hydrocarbons by contacting the monomer with a mixture of an organo-aluminum compound and a compound of a metal of groups IVb, Vb or VIb of the periodic table.

These catalysts have heretofore been produced by the reaction in an inert solvent medium of the organo-aluminum compound and the metal halide to form an insoluble complex as a precipitate, which is the catalyst. This precipitate is ordinarily in a finely divided condition.

These finely divided catalysts are characteristically sensitive to atmospheric contamination. In addition they appear to be inherently unstable. A typical catalyst is a hydrocarbon insoluble complex of titanium tetrachloride and triisobutyl aluminum prepared in an heptane medium. The rapid decline in catalytic activity of this typical Ziegler catalyst has been documented recently by A. Orzechowski, J. Polymer Sci. 34, 74–5 (1959). The data appearing in Table I following on yield of polyethylene after periods of aging in an inert atmosphere is taken from the Orzechowski article. The gram polymer/gram catalyst data are calculated from the Orzechowski data. Aging in each instance is the elapsed time between placing of the catalyst in the polymerization vessel and introduction of ethylene into the vessel.

TABLE I

| Catalyst Age, (min.) | Yield of Polyethylene, (g.) | Gram Polymer/Gram Catalyst |
|---|---|---|
| 0 | 10.5 | 240 |
| 1–2 | 6.5 | 148 |
| 15 | 1.9 | 43.3 |
| 30 | 0.2 | 4.5 |
| 30 | 0.1 | 2.3 |

It can be seen from Table I that after only 1 to 2 minutes 40% of the original catalyst activity had been lost, after 15 minutes 84% had been lost and after 30 minutes 98 to 99% had been lost. These data reflect the inherent instability of conventionally prepared transition metal halide alkyl aluminum catalyst complexes in even inert atmospheres.

As a result of this poor stability, these catalysts have heretofore had to be freshly prepared for each polymerization. This, of course, is inconvenient and costly. Consequences of using partially inactivated catalyst include low yields of polymer and undesirably high concentrations of catalyst residue in the polymer obtained.

It is an object, therefore, of the present invention to provide transition metal halide organo-aluminum catalyst systems which are substantially unaffected in catalytic activity by aging for extended periods, even at elevated temperatures.

It is another object to provide method for the preparation of transition metal halide organo-aluminum catalyst systems which are substantially unaffected in catalytic activity by aging for extended periods and at elevated temperatures.

It is a further object to provide a process for the production of highly crystalline polymers of olefinically unsaturated hydrocarbons wherein high polymerization rates and minimal catalyst residues are achieved.

Heretofore, it has been known to prepare α-olefin polymers, described as being "highly crystalline" by contacting an α-olefin with catalytic amounts of a complex of a trialkyl or triaryl aluminum compound, e.g. triisobutyl aluminum or triphenyl aluminum and a lower valent transition metal halide e.g. α-titanium trichloride. The crystalline content of these olefin polymers is greater than olefin polymers otherwise prepared but even these polymers are still invariably contaminated with a substantial amount, say from 5 to 50% by weight of wholly amorphous polymer i.e. polymer which is totally devoid of any crystallinity. This grease-like polymerization product is detrimental to the overall physical properties of the so-called "highly crystalline" α-olefin polymer. For example, the wholly amorphous fraction will not bear a load and the mechanical properties of the polymer are thus reduced. Also, wholly amorphous polymer sweats out causing sticky, unattractive surfaces on shaped contours. Poor solvent resistance is a further consequence of the presence of a wholly amorphous fraction. Crystalline α-olefin polymer is essentially insoluble at temperatures below the crystalline melting temperature but wholly amorphous α-olefin polymers tend to be quite soluble in a great variety of organic solvents.

Removal of the wholly amorphous fraction, e.g. by extraction with diethyl ether can ameliorate these difficulties but this separation is a costly and tedious undertaking. After the amorphous fraction is removed there remains what can be termed a "residue product." This residue product, despite the extractions, has only moderate crystallinity, in fact crystallinity too low for many commercially important applications where the very highest levels of crystallinity are required, for example the spinning of fibers.

Product quality problems are not the only disadvantages accruing from polymerizations producing a wholly amorphous polymer fraction. Processing difficulties also arise. Particularly difficult are liquid phase polymerizations conducted at temperatures below the crystalline melting temperature of the polymer. In this process the product desirably is obtained as a slurry of polymer particles in the reaction vehicle and the viscosity of the reaction mass (polymer/catalyst slurry) is substantially the viscosity of the reaction vehicle. The presence of wholly amorphous polymer, however, which is readily soluble in the reaction vehicle, greatly increases the viscosity of the slurry and complicates subsequent handling operations.

It is a further object, therefore, of the present invention to provide method for producing highly crystalline α-olefin polymers which are substantially completely free of wholly amorphous fractions.

It is another object to provide transition metal-halide-organo-aluminum catalyst systems which are capable of producing highly crystalline α-olefin polymers substantially completely free of wholly amorphous fractions.

It is another object to provide transition metal-halide-organo aluminum catalyst systems with improved catalytic effectiveness and unreduced ability to produce highly crystalline α-olefin polymers.

It is another object to provide α-olefin polymers substantially completely free of wholly amorphous fractions without post-polymerization extraction.

It is still another object to provide method for the preparation of transition metal halide-organo aluminum catalyst systems which have great stability and produce highly crystalline α-olefin polymers substantially completely free of wholly amorphous fractions.

It is still another object to achieve finely divided organo-metallic catalysts without grinding.

It has now been discovered that finely divided organo-metallic co-catalysts exhibiting high initial activity and great resistance to deterioration by aging and which produce highly crystalline α-olefin polymer are prepared by reacting together, under continual high speed agitation providing heat producing fluid shear, a fluid transition metal halide and a fluid organo-aluminum compound to produce a super finely divided, inert liquid hydrocarbon insoluble, precipitate, and contacting the co-catalyst precipitate thus obtained with a hydrocarbon aluminum monohalide compound free of aliphatic unsaturation in an amount sufficient to render the precipitate catalytically active.

Polymers substantially completely free of wholly amorphous fraction are produced by contacting an α-olefin with the catalytically active precipitate under polymerization conditions.

Most surprisingly, the crude, unextracted α-olefin polymers produced with the catalysts of this invention exceed in crystallinity, melting point, and mechanical properties not only the crude α-olefin polymers made by conventional trialkyl-aluminum-titanium trihalide catalysts but completely unexpectedly even these α-olefin polymers after successive extractions with diethyl ether, pentane, hexane and heptane. The prior art α-olefin polymers contain a practically unremovable wholly amorphous fraction which is inimical to good polymer properties. The polymers produced in this invention are substantially completely free of wholly amorphous polymer ab initio obviating costly extractions and providing directly a superior polymer.

The organo-metallic polymerization co-catalysts produced by the method of this invention are super-finely divided precipitates consisting of highly geometrically uniform, essentially spheroidal particles. Precipitates obtained under the hereinafter set forth preferred conditions of shear producing agitation have an average particle size diameter between 200 and 300 Angstroms with no appreciable number of particles greater than 500 Angstroms in diameter. The geometry of the particles produced herein is unlike crushed or ground organo-metallic complex precipitates heretofore known which are sharp edged and irregular. The particles obtained are rounded and essentially uniform and are, therefore, not prone to agglomeration. These particles have not been known heretofore.

A Ziegler catalyst precipitate prepared in the manner of this invention surprisingly retains catalytic properties for many days, weeks or months rather than for only a few minutes as with the same catalysts only conventionally prepared. Mere stirring type agitation or no agitation at all, such as presently practiced in the art, provides Ziegler catalysts inferior in activity, both initially and after aging, to those of this invention. For example, the catalytic life of a typical Ziegler catalyst, a reaction product of titanium tetrachloride and triisobutyl aluminum is greatly multiplied by use of the method of this invention. As shown in Table I above, after only 30 minutes of aging at 50° C. the catalyst was reproduced one hundred-fold in productivity from 240 to 2.3 grams polymer/gram catalyst. In contrast to this, a catalyst from these reactants under the shear agitation of this invention had a productivity after 20 days of room temperature aging (⅔ of a month at 25° C.), and then being heated at 125° C. in an inert atmosphere for 30 minutes of over 300 grams of polymer per gram catalyst. In comparison, a catalyst prepared from these components by Orzechowski had a maximum productivity of only 240 grams of polymer per gram of catalyst without any aging and this productivity declined a hundred-fold in 30 minutes.

Not only is the catalyst system of the present invention more stable than Ziegler catalyst systems heretofore known, but it also enables preparation of highly crystalline polymers of α-olefins which are substantially completely free of wholly amorphous fractions. These highly crystalline α-olefin polymers therefore are superior in mechanical properties e.g. load-bearing properties, are adapted to spinning into fibers, have exceptional solvent resistance at temperatures below their melting point temperature and do not undergo sweat-out.

The difference in wholly amorphous polymer fraction content between the α-olefin polymer of the prior art and the α-olefin polymers herein produced is pointed up by comparative extraction tests. Polypropylene prepared with a heretofore known trialkyl aluminum-α-titanium trichloride catalyst contains from 10 to 30% by weight of wholly amorphous polymer as determined by exhaustive extractions with boiling diethyl ether in a jacketed Sohxlet extractor. Polypropylene prepared with a hydrocarbon aluminum monohalide treated trialkyl aluminum-α-titanium trichloride precipitate catalyst of this invention when thus exhaustively extracted loses zero percent to less than 2 percent by weight, which is within the experimental error inherent in the apparatus, demonstrating the substantially complete absence of a wholly amorphous fraction in the polymer.

The above data are even more significant when it is considered that the above 2 percent maximum wholly amorphous polymer fraction figure includes the amorphous portions soluble in the reaction vehicle. Inclusion of such amorphous polymer in calculating crystallinity contrasts with the normal practice in the art where the mother liquors are discarded and the thus already once extracted polymer is extracted and these last results are the ones presented to show crystallinity. Because the solubility of the wholly amorphous fractions in the reaction vehicle has been overlooked by the art and this material thrown away in the usual polymer work-up, many estimates of crystallinity have been uncritical and overly optimistic. The scale of possible error by this omission is indicated by the following.

A catalyst slurry prepared as in Example 1 below was used, except it was made at a molar ratio of triisobutyl aluminum to titanium tetrachloride of 0.755 to 1.000.

Two liters of n-heptane were dried with a stream of dry $N_2$, until the effluent gas contained 14 p.p.m. water. To this was added 30.3 milliliters of a slurry containing 10.9 millimoles of titanium halide and 1.52 g. (7.6 millimoles) of triisobutyl aluminum. This mixture was aged 35 minutes at 23° C. Propylene was passed through for 4 hours at 40±3° C. at atmospheric pressure. The slurry of polymer and catalyst was quenched with 400 ml. isopropanol and filtered. There was obtained a yield of 70.38 g. (fraction 1). Of this 54.13 g. were extracted to exhaustion with diethyl ether for 32 hours. The total weight loss was 0.45 g. or 0.89%.

The filtrate from fraction 1, was extracted with aqueous acid to remove inorganic, dried and concentrated in vacuo. There was obtained 28.8 g. of greasy residue, devoid of crystallinity, and completely amorphous by infrared measurement.

Thus this catalyst recipe polymerized propylene to solid polymer containing about 30% amorphous polymer, all but 0.89% of which is discarded in the usual work-up procedures.

The agitation during reaction necessary to the practice of the method of co-catalyst preparation of this invention can be achieved with numerous combinations of vessels and agitating means known to the art. High speed impellers such as a Tri Homo Disc Mill and rotating vented cones such as a Duplex Dispersator are preferred types of agitating means. Any apparatus capable of producing fluid shear sufficient to give a heat output of at least 10 calories per minute and preferably 100 calories per minute per liter of agitated fluid in the reaction system is suitable. Preferred apparatus will accomplish the requisite calorie output rapidly by producing a higher speed fluid shear in the system. This agitation is basically simply a fluid shear. Shear is present in all agitated vessels to some degree, for example in stirred reactors although the reaction mass rotates with the agitating means, some shearing occurs at the interface of the vessel wall and the moving reaction mass. This is not a fluid shear. To obtain fluid shear it is essential to provide an agitation pattern within a fluid mass such that portions of the mass are in frictional, sliding contact with other portions of the mass. "Fluid shear" as used herein refers to this internal, sliding frictional contact between like liquid masses as distinguished from external sliding frictional contact between unlike masses i.e., vessel walls and reaction mass. The inevitable incident of shear is friction and this means production of heat. A convenient index of the quality of shear or the degree of friction being obtained is the amount of heat produced. It is to be emphasized that the preparation of the co-catalyst and the practice of the method of this invention is no wise dependent upon some critical temperature being achieved in the reaction vessel. Rather the heat differential induced by shear agitation in the reaction vessel between the start of the reaction and the end of reaction is what is important. The desirable catalyst products described above are produced when the agitation in the reaction vessel is sufficient to give an output of 10 calories per minute per liter of agitated fluid. Calorie output is easily determined by multiplying the heat rise obtained in the particular agitated fluid, e.g. the reaction solvent, times the volume and times the specific heat thereof. Since the reaction to form the co-catalyst is exothermic, it is best to ascertain prior to carrying out co-catalyst preparation whether a particular vessel and agitating system will produce sufficient shear, e.g. by agitating the proposed reaction solvent only. Then, having established that minimum shear at least is obtained in a particular vessel, co-catalyst preparation can be carried out without constant measurement of shear development.

Alternaitvely quality and quantity of shear can be compared with a bench mark of a 5° C. rise at steady state over ambient temperature obtained when agitating 500 milliliters of heptane in an insulated vessel under substantially adiabatic conditions.

As pointed out above, fluid shear is essential to the present method of co-catalyst preparation. Therefore the co-catalyst reactants, the transition metal halide and the organo-aluminum compound, must both be in the fluid state. Thus, reaction can be effected where the reactants are gaseous fluids or liquid fluids. Liquid fluidity is preferred for convenience in handling the reactants and the product. Liquid fluidity is achieved by using normally liquid reactants (i.e. at room temperature) or by dissolving normally solid reactants in a suitable inert organic solvent or mixture of solvents such as are well known in the art, for example those disclosed in U.S. Patent 3,032,-511, issued May 1, 1962, to A. W. Langer et al. The two reactants can be dissolved in the same or different solvents. One reactant can be placed in the reaction vessel as a solution and the other can be in the undissolved but liquid state.

It is preferred to dissolve the reactants whether they be liquids or not in an inert organic liquid selected from the class of aromatic and saturated aliphatic hydrocarbons and halogenated aromatic hydrocarbons which are solvents for the reactants but which do not dissolve the reaction product. Specific classes of such solvents include saturated aliphatic and alicyclic hydrocarbons such as alkanes and cycloalkanes e.g. heptane and cyclohexane, aromatically unsaturated hydrocarbons, such as benzene, alkyl substituted aromatically unsaturated hydrocarbons such as toluene, and halogen substituted aromatically unsaturated hydrocarbons, such as dichlorobenzene.

As the transition metal halide there can be used in this invention compounds having the formula $$MO_aX_b$$

wherein M is a transition metal selected from groups IVb, Vb or VIb of the Deming periodic table (Handbook of Chemistry and Physics, 30th ed., page 312) for example, Ti, Zr, HF, V, Ni, Ta, Cr, Mo, and W; and having a valence $z$ greater than III in the compound $MO_aX_b$; O is oxygen and X is a halogen; $b$ is an integer having a value of from 2 to $z$; and $a$ is an integer equal to $z-b/2$ and has a value of 0 or greater. Thus the term "transition metal halide" as used herein includes metal halides and metal oxyhalides. Particularly desirable metal compounds in this invention are titanium tetrachloride, vanadium oxychloride and chromium oxychloride.

As indicated above the catalysts of this invention are the result of a two stage preparation. In the first stage, the transition metal halide is reduced from its initial valence to a lower valence. This reduction effects a change in the transition metal halide from soluble to insoluble in the reaction medium and high shear agitation as above described is essential throughout. Because the primary chemical effect of this stage is a reduction in valence, the particular organo-aluminum compound is not critical and can be one or more of the compounds having the formula $$AlR_mY_{3-m}$$

wherein R is a hydrocarbon radical free of aliphatic unsaturation such as alkyl e.g. ethyl, propyl, and butyl, or aryl e.g. phenyl; $m$ is a number greater than zero and not more 3; and Y is a halogen i.e. a fluoro, chloro, bromo or iodo group.

The proportions of the compound $MO_aX_b$ and $AlR_mY_{3-m}$ in the first stage are not narrowly critical. As a minimum there should be used a sufficient amount of the aluminum compound to reduce the valence of substantially all the atoms of the transition metal, M, to less than IV and preferably to III or below. The amount employed where at least a minimum is present is not critical to the invention.

It will be noted from the above-given description of the compound $MO_aX_b$ the valence of M, there termed "$z$" was "greater than III" in the compound $MO_aX_b$. Valence of M in any specific compound will of course be an integer but it is contemplated in this invention that mixtures of more than one metal halide or mixtures of metal halides wherein the metal exists in different valence states in the two compounds can be used provided the average valence for the transition metal is greater than III.

Where there is but one metal halide present to react with the organo-aluminum compound the term $z$ will equal IV or more. Average valence of the transition metal in a particular reaction system can be calculated from the data provided by an analysis of the reaction system according to the method of E. G. Tabakova and Z. V. Soloveva, Zavodskaya Lab. 22, No. 12, 1417 (1956).

The quantity of aluminum compound necessary to reduce the valence state of substantially all transition metal atoms to less than IV is in the first instance dependent on the number of transition metal reactive groups i.e. hydrocarbon groups bound to the aluminum. For that reason it is usual to consider the "hydrocarbon equivalents" of the aluminum compound rather than moles of aluminum compound in calculating proportions of catalyst reactants. It is easily seen that triethyl aluminum has 3 hydrocarbon equivalents, diethyl aluminum monochloride 2 hydrocarbon equivalents and so forth.

As stated, in carrying out the first stage of the catalyst preparation, wherein the co-catalyst is prepared it is essential to reduce the valence of substantially all the atoms of metal M to less than IV. The reaction of the hydrocarbon aluminum compound with the transition metal halide proceeds by first reducing the valence of the transition metal from its valence in the compound $MO_aX_b$ ($z$ in the formula above) to III. When the valence is at III the transition metal halide precipitates and the reaction mixture becomes two phase. For the first stage reaction to valence III, there is used one hydrocarbon equivalent for each valence above III. Thus, for example, to reduce $TiCl_4$ to $TiCl_3$ one hydrocarbon equivalent is added, reducing the valence of Ti from IV to III. Similarly where M has a valence of V, e.g. V in $VOCl_3$, 2 hydrocarbon equivalents is sufficient. And where M has a valence of VI, e.g. Cr in $CrO_2Cl_2$, 3 hydrocarbon equivalents is sufficient.

Use of excessive amounts of aluminum compound results in overreduction of the transition metal, ultimately to the metal itself. In general, a maximum of 30 equivalents of hydrocarbon per equivalent (i.e. mole) of metal halide should be observed. Very careful reaction and closely controlled low temperatures are necessary to avoid overreduction when using greater than 30 equivalents of hydrocarbon per equivalent of metal. Where reaction temperature is above 100° C. it is desirable to lower the number of hydrocarbon equivalents below 30 progressively as temperatures used rise above 100° C.

In the second stage of the catalyst preparation the insoluble lower valent transition metal halide co-catalyst resulting from the first step is rendered catalytically active by contacting with additional amounts of certain organo-aluminum compounds. It is this contacting stage which is absolutely essential to the obtaining of highly crystalline α-olefin polymers.

Although a wide variety of co-catalysts are taught in the art for this catalytic activation, it is only with a particular class of organo-aluminum compounds that the catalysts of this invention, which are capable of producing the very highest crystalline content polyolefins substantially completely free of wholly amorphous fraction can be prepared.

The members of this class are hydrocarbon aluminum mono-halides free of aliphatic unsaturation. These compounds have the general formula $$Al(R_h)_2G$$

wherein $R_h$ is a hydrocarbon radical free of aliphatic unsaturation such as alkyl e.g. preferably having from 1 to 10 carbon atoms, methyl, ethyl, propyl, isopropyl, butyl, isobutyl, decyl and the like; aryl e.g. phenyl, alkaryl and aralkyl, preferably having from 6 to 10 carbons atoms e.g. phenylethyl, tolyl, xylyl and the like; and G is a halogen, i.e. a fluoro, bromo, iodo, and preferably a chloro group.

Ratios of hydrocarbon aluminum monohalide to transition metal halide are not narrowly critical because the III valence state metal compounds are solids and only a small percent of the solid particles is composed of metal atoms; and of these metal atoms only a portion thereof are on the surface. Only enough hydrocarbon aluminum monohalide to activate these metal atoms is necessary. A wide range of ratios is shown in Table II. As is there shown as low a ratio as 2.15:1 of diethyl aluminum chloride to transition metal halide provides III valent metal containing catalysts. A ratio of 0.07:1 can be used with success as well.

TABLE II

| Concentration $Et_2AlCl$ [1]: mmoles/liter | Mole ratio: $Et_2AlCl:TiCl_3$ | Polymer productivity: g./mmole $TiCl_3$ | Percent amorphous | Intrinsic viscosity | Catalyst age, days |
|---|---|---|---|---|---|
| 15.4 | 2.15:1 | 0.762 | 0.86 | 4.87 | 47 |
| 17.4 | 2.65:1 | 0.845 | 0.00 | 7.73 | 50 |
| 26.6 | 3.93:1 | 1.25 | 0.56 | 6.70 | 59 |
| 27.2 | 4.22:1 | 1.20 | 0.12 | 5.55 | 60 |
| 41.2 | 6.03:1 | 1.67 | 1.17 | 4.74 | 53 |
| 42.0 | 6.34:1 | 1.72 | | | 54 |
| 66 | 9.80:1 | 2.48 | 1.17 | 9.18 | 52 |
| 65.8 | 9.92:1 | 2.26 | 1.04 | 7.11 | 51 |
| 68.5 | 10.33:1 | 2.52 | 1.67 | 6.06 | 60 |
| 103 | 16.05:1 | 3.35 | 0.85 | | 61 |
| 136.5 | 20.05:1 | 4.04 | | | 65 |
| 167.5 | 25.28:1 | 4.83 | 1.56 | | 66 |
| 195 | 28.88:1 | 5.45 | | | 67 |
| 200 | 29.35:1 | 5.35 | 1.29 | | 68 |
| 329 | 48.9:1 | 8.49 | 2.47 | | 70 |

[1] $Et_2AlCl$ is diethyl aluminum chloride.

The catalyst components in either stage can be added to the reaction zone in any order. In continuous reaction systems independent streams, one of each of the components, can be advantageously fed into one end of the agitating-reacting zone. Rate of addition and contact times are not critical with contact times ranging from, for example, 30 seconds to 2 hours having been successfully used. Portions of one or the other of the catalyst components can be added to the whole of the other catalyst component. A highly convenient manner of addition of the hydrocarbon aluminum halide is with the α-olefin to be polymerized.

The temperature at which the catalyst preparation, first and second stage, is conducted is not critical in the method of this invention. Generally speaking, the reaction can be effected at temperatures ranging from 0° C. to 200° C., and particularly 25 to 175° C. but temperatures higher or lower can be employed with success. It is preferred to conduct at least a portion of the reaction at temperatures over 100° C., to ensure complete utilization of the organo-aluminum compound.

The use of pressure is not required, except to keep liquid a volatile reaction solvent at elevated reaction temperatures, and will not ordinarily be used, since numerous organic solvents which are liquid at elevated temperatures are readily available.

In the pratctice of a preferred embodiment of the present invention in the first stage of the method a solution of a lower alkyl aluminum compound e.g. tri-n-propyl or triisobutyl aluminum or diisobutyl aluminum chloride in n-heptane or n-decane is added dropwise over the course of about an hour to a high shear agitated solution of either titanium tetrachloride or vanadium oxychloride in the same solvent until there is a molar ratio of aluminum alkyl to transition metal halide of from 0.3:1 to 0.5:1. Bulk temperature is permitted to rise uncontrolled during the first stage. Concentration of the components in their respective solutions and the reaction mixture are in no way critical. Convenience in handling is the determining factor.

The solution is then further agitated in a suitable apparatus, that is, an apparatus demonstrated to be capable of imparting sufficient motion to the reaction solution that the resulting fluid turbulent shear produces heat at a preferred rate of at least 100 calories per minute per liter of solvent. Preferred devices include a Duplex Dispersator especially in a baffled vessel, a Tri Homo Disc Mill and a Colloid Mill. Agitation with a high shear is continued for about an hour.

In the second stage the reaction slurry from above is heated to a temperature above about 100° C. and preferably above about 150° C. for from 15 minutes to 600 minutes, preferably about 60 minutes. The mixture is then cooled to below 60° C. if necessary, prior to the addition of hydrocarbon aluminum halide to avoid excessive reduction of the transition metal halide. The preferred molar ratio of hydrocarbon aluminum halide to transition metal halide is from 0.1:1 to 100:1. The catalyst suspension thereby produced is removed under an inert atmosphere.

Under certain conditions, the use of aliphatic straight chain hydrocarbon aluminum compounds for the first stage of the catalyst preparation may produce by-products which reduce catalyst efficiency, but without changing the structure of the resulting polymers. It is, therefore, preferred that when catalysts of maximum effectiveness are desired, that the hydrocarbon aluminum compounds contain only hydrocarbon groups having branches on the alpha or beta carbon atom. For example, under conditions conducive to by-product formation catalysts from triisobutyl aluminum are to be preferred over catalysts from triethyl aluminum.

Catalysts prepared in accordance with the method of this invention are superior for the polymerization of alpha olefinically unsaturated hydrocarbons heretofore polymerized with Ziegler catalysts, especially those which have the general formula $$R_0-CH=CH_2$$

wherein $R_0$ is a saturated aliphatic, alicyclic or an aromatic radical, alone or in mixture with one another.

The practice of the present invention is illustrated by the following examples which are not intended to be nor should they be construed as limitative of the invention. All parts and percentages are by weight unless otherwise stated.

The apparatus used in the examples were tested for adequate shear capacity by introducing 500 milliliters of heptane thereinto and agitating as if during catalyst preparation. Temperature rise was recorded at various intervals. The apparatus used in Example 1 has a calorie output rate of 100 calories per minute per liter.

EXAMPLE 1

*Catalyst preparation, first stage*

Pure n-decane was dried with nitrogen until the effluent nitrogen contained less than 2 parts per million of water. To a 475.03 gram portion of the n-decane there was added 74.50 grams of C.P. grade titanium tetrachloride and the solution blown under dry nitrogen into a dried 1 liter baffled resin kettle. The kettle was fitted with a 3″ Duplex Dispersator, a dropping funnel, thermometer, nitrogen source, and reflux condenser. The Dispersator was driven at 2,000 r.p.m. and a solution of 27.46 grams of triisobutyl aluminum in 78.12 grams of n-decane was added dropwise over a period of 28 minutes. External cooling was provided to maintain the temperature between 25° C. and 30° C. during this period. The resulting slurry was agitated an additional 60 minutes at 30° C. with external cooling. The resulting suspension was heated to 155° C. within 15 minutes. In another 15 minutes the temperature was 165° C. Heating was continued for an additional 90 minutes at 174° C. The suspension resulting was cooled in 50 minutes to 44° C. and the precipitate was removed in vacuo in an atmosphere of nitrogen. The product weighed 735.4 grams, had a density of 0.785 gram/milliliter and a nominal triisobutyl aluminum to titanium tetrachloride ratio of 0.35:1.

*Catalyst preparation, second stage*

1500 ml. of ASTM grade n-heptane was dried to 3 parts per million of water in the effluent by a nitrogen and propylene purge. There was added to the heptane 1.92 grams diethyl aluminum chloride (15.92 millimoles). There was then added 9.40 grams of the suspension obtained above (5.02 millimoles of titanium halide) to form the catalyst.

EXAMPLE 2

*Polymerization of propylene*

Using the n-heptane/catalyst mixture prepared in Example 1 polymerization of propylene was carried out by passing propylene gas at 40° C. and 8 p.s.i. gauge pressure into the n-heptane/catalyst mixture for 2.5 hours. At the end of this period, the reaction mixture was quenched with 200 milliliters of isopropanol and the whole poured into an additional 1500 milliliters of an equivolume mixture of methanol and isopropanol. The polymer precipitate was filtered and dried to constant weight. Yield was 31.51 grams, equal to 6.28 grams per millimole of titanium halide. The filtrate was washed with 10% aqueous HCl, neutralized with water, dried and concentrated in vacuo. Nonvolatiles in the filtrate, or residue, was less than 100 milligrams indicating the substantially complete absence of any quenced, reaction vehicle soluble, wholly amorphous fraction in the polymer. The dried polymer prepared was extracted with diethyl ether to exhaustion. Percent ether solubles was 0.0%.

EXAMPLE 3

This example illustrates the preparation of polypropylene under autogeneous pressures. Propylene gas

950 grams, containing less than 5 parts per million of water, was condensed in a stainless steel autoclave by passing coolant through the cooling coils. To the autoclave there was added 0.64 gram (5.3 millimoles) of diethyl aluminum chloride, and 2.34 millimoles of the suspension prepared in Example 1. The autoclave was heated to 70° C.; the pressure was 440 p.s.i.g. After 3 hours at 70° C. the autoclave was vented and the product was slurried with methanol, filtered and dried to constant weight. Yield was 393 grams of polypropylene. A sample of the product was extracted with diethyl ether as in the preceding example. Percent ether solubles was 3.6%.

EXAMPLE 4

Example 1 was duplicated but employing 78.41 grams of titanium tetrachloride (414 millimoles) dissolved in 356 grams of n-decane containing less than 7 parts per million of water and 29.33 grams of diethyl aluminum chloride (243 millimoles) in 150 milliliters of n-decane. The Disperserator was started and the temperature rose within 64 minutes from 25° C. to 55° C. Agitation was continued at 55° C. for 150 minutes. The mixture was then raised to reflux temperature (163° C.) over 55 minutes. Thereafter, heating was continued at 175° C. for 95 minutes. The mixture was then cooled to 45° C. in 30 minutes. The suspension obtained weighed 708.3 grams, had a density of 0.80 and contained 0.588 millimole of titanium halide per gram.

EXAMPLE 5

Example 2 was duplicated employing 36.23 grams (300 millimoles) of diethyl aluminum chloride and 17.52 grams (10.25 millimoles) of the suspension prepared in Example 4. There was obtained 54.56 grams of polypropylene equal to a yield of 5.35 grams of polymer per millimole of titanium halide. The polymer was extracted with diethyl ether. Percent ether solubles was 1.29%. The filtrate contained 0.35 gram of non-volatiles. The mole ratio of diethyl aluminum chloride to titanium halide in this example was about 30:1.

EXAMPLE 6

Polymerization of butene-1

Using the n-decane/catalyst mixture prepared in Example 1, polymerization of butene-1 is carried out by passing butene-1 gas at 40° C. and 8 p.s.i.g. into the n-decane/catalyst mixture for 2.5 hours. At the end of this period the mixture is quenched with 200 ml. of isopropanol and the whole is poured into an additional 1500 ml. of an equi-volume mixture of methanol and isopropanol. The polymer precipitate is filtered and dried to constant weight. Yield is 27.34 grams, equal to 5.45 g. of polymer per millimole of titanium halide. The filtrate is washed with 10/ aqueous HCl, neutralized with water dried and concentrated in vacuo. Nonvolatiles in the filtrate or residue is less than 100 mg. indicating substantially complete absence of any quenched, reaction which soluble, wholly amorphous fraction in the polymer. The dried polymer is extracted with diethyl ether to exhaustion. Percent ether solubles is 1.9%. The crystalline melting point by disappearance of birefringence is 125–126° C.

It is further characteristic of the catalyst described above, that they produce "living α-olefin polymers." For example, the titanium halide-$Et_2AlCl$ combination polymerizes propylene in such a manner that the polymer chain remains permanently attached to the catalyst site until the catalyst is destroyed by quenching.

This property, together with the retention of catalytic activity makes these catalysts ideal for preparing non-random, block copolymers of α-olefins with other polymerizable alpha olefins. These copolymers have been prepared from ethylene 4- and propylene, propylene and styrene, α-butene and methylpentene-1, hexene-1 and p-chlorostyrene, and ethylene and 4-methylpentene-1. Primarily these polymers can be differentiated from graft block copolymers by the fact that each of the homopolymer segments have been produced stereospecifically, and is therefore crystallizable.

What is claimed is:

1. In the method for the preparation of highly geometrically uniform, essentially spheroidal particulate organo-metallic catalysts from
   (A) transition metal halides having the formula $$MO_aX_b$$

wherein M is a transition metal selected from the class consisting of metals of groups IV$b$, V$b$ and VI$b$ of the Deming periodic table having a valence $z$ greater than 3 in the compound $MO_aX_b$; O is oxygen and X is a halogen; $b$ is an integer having a value of 2 to $z$ and $a$ is an integer equal to $z-b/2$ and has a value of at least zero, and (B) an organo-aluminum compound having the formula $$AlR_mY_{3-m}$$

wherein R is a hydrocarbon group free of aliphatic unsaturation, $m$ is a number greater than zero and not more ahtn 3, and Y is a halogen, which comprises contacting said metal halide reactant with a sufficient amount of said organo-aluminum compound reactant to reduce the valence of M to less than IV, while both reactants are fluid and throughout the contacting step subjecting the reactants to continual high speed agitation in a pattern characterized by internal fluid shear which is sufficient to produce at least 10 calories per minute per liter of agitated fluid and precipitating the reaction product from the reaction medium, the improvement which comprises contacting the precipitate with a hydrocarbon aluminum monohalide compound free of aliphatic unsaturation having the general formula $Al(R_H)_2G$ wherein $R_H$ is a hydrocarbon radical free of aliphatic unsaturation and G is a halogen in an amount sufficient to render the precipitate catalytically active.

2. In the method for the preparation of highly geometrically uniform, essentially spheroidal particulate organo-metallic catalysts from
   (A) transition metal halides having the formula $$MO_aX_b$$

wherein M is a transition metal selected from the class consisting of metals of groups IV$b$, V$b$ and VI$b$ of the Deming periodic table having a valence $z$ greater than 3 in the compound $MO_aX_b$; O is oxygen and X is a halogen; $b$ is an integer having a value of 2 to $z$ and $a$ is an integer equal to $z-b/2$ and has a value of at least zero, and (B) an organo-aluminum compound having the formula $$AlR_mY_{3-m}$$

wherein R is a hydrocarbon group free of aliphatic unsaturation, $m$ is a number greater than zero and not more than 3, and Y is a halogen, which comprises contacting said metal halide reactant with a sufficient amount of said organo-aluminum compound reactant to reduce the valence of M to less than IV while both reactants are fluid and throughout the contacting step subjecting the reactants to continual high speed agitation in a pattern characterized by internal fluid shear which is sufficient to produce at least 10 calories per minute per liter of agitated fluid, and precipitating the reaction product from the reaction medium, the improvement which comprises contacting the precipitate with a hydrocarbon aluminum monohalide compound free of aliphatic unsaturation having the general formula $Al(R_H)_2G$ wherein $R_H$ is a hydrocarbon radical free of aliphatic unsaturation and G is a halogen in a molar ratio of said hydrocarbon aluminum monohalide to said transition metal halide of at least 0.07:1.

3. In the method for the preparation of highly geometrically uniform, essentially spheroidal particulate organo-metallic catalysts from
   (A) transition metal halides having the formula $$MO_aX_b$$

wherein M is a transition metal selected from the class consisting of metals of groups IV$b$, V$b$ and VI$b$ of the Deming periodic table having a valence $z$ greater than 3 in the compound $MO_aX_b$; O is oxygen and X is a halogen; $b$ is an integer having a value of 2 to $z$ and $a$ is an integer equal to $z-b/2$ and has a value of at least zero, and (B) an organo-aluminum compound having the formula $$AlR_mY_{3-m}$$

wherein R is a hydrocarbon group free of aliphatic unsaturation, $m$ is a number greater than zero and not more than 3, and Y is a halogen, which comprises contacting said metal halide reactant with a sufficient amount of said organo-aluminum compound reactant to reduce the valence of M to less than IV while both reactants are dissolved in a reaction medium comprising an inert organic solvent therefor which is not a solvent for their reaction product, and throughout the contacting step subjecting the reactants to continual high speed agitation in a pattern characterized by internal fluid shear which is sufficient to produce at least 100 calories per minute per liter of solvent and precipitating the reaction product from the reaction medium, the improvement which comprises heating the precipitate to at least 100° C. and contacting the precipitate with a hydrocarbon aluminum monohalide compound free of aliphatic unsaturation having the general formula $Al(R_H)_2G$ wherein $R_H$ is a hydrocarbon radical free of aliphatic unsaturation and G is a halogen in a molar ratio of said hydrocarbon aluminum monohalide to said transition metal halide of from 0.1:1 to 100:1.

4. Method claimed in claim 3 wherein the transition metal halide is titanium tetrachloride, the organo-aluminum compound is triisobutyl aluminum and the hydrocarbon aluminum monohalide is diethyl aluminum chloride.

5. A highly geometrically uniform essentially spheroidal particulate, rounded organo-metallic catalyst which is resistant to agglomeration and free of sharp edges and irregular contours and which has an average particle size diameter between 200 and 300 Angstroms and no appreciable number of particles exceeding 500 Angstroms, said catalyst being the reaction product of a co-catalyst comprising the reaction product of (A) a transition metal halide having the formula $$MO_aX_b$$

wherein M is a transition metal selected from the class consisting of metals of groups, IV$b$, and V$b$ and VI$b$ of the Deming periodic table having a valence $z$ greater than 3 in the compound $MO_aX_b$; O is oxygen and X is a halogen; $b$ is an integer having a value of 2 to $z$ and $a$ is an integer equal to $z-b/2$ and has a value of at least zero, and (B) an organo-aluminum compound having the formula $$AlR_mY_{3-m}$$

wherein R is a hydrocarbon group free of aliphatic unsaturation, $m$ is a number greater than zero and not more than 3, and Y is a halogen, the reaction of (A) and (B) being conducted while in a fluid phase and under continual high speed agitation in a pattern characterized by internal fluid shear sufficient to produce at least 10 calories per minute per liter of agitated fluid, said organo-aluminum compound being present in an amount sufficient to reduce the valence of M to less than IV, with a catalytically activating amount of a hydrocarbon aluminum monohalide compound free of aliphatic unsaturation having the general formula $Al(R_H)_2G$ wherein $R_H$ a hydrocarbon radical free of aliphatic unsaturation and G is a halogen.

6. The organo-metallic catalyst claimed in claim 5 wherein the transition metal halide is titanium tetrachloride.

7. The organo-metallic catalyst claimed in claim 5 wherein the transition metal halide is vanadium oxychloride.

8. Method for polymerizing olefinically unsaturated hydrocarbon monomers having the formula $R_o$—CH=CH$_2$ wherein $R_o$ is a member selected from the class consisting of hydrogen, saturated aliphatic, alicyclic and aromatic hydrocarbon groups which comprises contacting said monomer with a highly geometrically uniform essentially spheroidal particulate organo-metallic catalyst having an average particle size between 200 and 300 Angstroms in diameter and wherein no appreciable number of particles exceeds 500 Angstroms, said catalyst having been produced from a co-catalyst comprising the fluid shear reaction product of (A) transition metal halides having the formula $$MO_aX_b$$

wherein M is a transition metal selected from the class consisting of metals of groups IV$b$, and V$b$ and VI$b$ of the Deming periodic table having a valence $z$ greater than 3 in the compound $MO_aX_b$; O is oxygen and X is a halogen; $b$ is an integer having a value of 2 to $z$ and $a$ is an integer equal to $z-b/2$ and has a value of at least zero, and (B) an organo-aluminum compound having the formula $$AlR_mY_{3-m}$$

wherein R is a hydrocarbon group free of aliphatic unsaturation, $m$ is a number greater than zero and not more than 3, and Y is a halogen, the reaction of (A) and (B) being conducted while in a fluid phase and under continual high speed agitation in a pattern characterized by internal fluid shear sufficient to produce at least 10 calories per minute per liter of agitated fluid, said organo-aluminum compound being present in an amount sufficient to reduce the valence of M to less than IV, with a catalytically activating amount of a hydrocarbon aluminum monohalide compound free of aliphatic unsaturation having the general formula $Al(R_H)_2G$ wherein $R_H$ is a hydrocarbon radical free of aliphatic unsaturation and G is a halogen.

9. The organo-metallic catalyst claimed in claim 5 wherein the hydrocarbon aluminum monohalide is present in a molar ratio to said transition metal halide of from 0.1:1 to 100:1.

10. The organo-metallic catalyst claimed in claim 9 wherein the hydrocarbon aluminum monohalide is diethyl aluminum chloride.

11. Method claimed in claim 8 wherein the olefinically unsaturated hydrocarbon monomer is propylene.

12. Method claimed in claim 8 wherein the olefinically unsaturated hydrocarbon monomer is butene-1.

13. Method claimed in claim 8 wherein the transition metal halide is titanium tetrachloride.

14. Method claimed in claim 8 wherein the transition metal halide is vanadium oxychloride.

15. Method claimed in claim 8 wherein the hydrocarbon aluminum monohalide is diethyl aluminum chloride.

References Cited by the Examiner

UNITED STATES PATENTS

| | | | | |
|---|---|---|---|---|
| 3,032,510 | 5/1962 | Tornqvist | | 252—429 |
| 3,112,300 | 11/1963 | Natta | | 260—93.7 |

JOSEPH L. SCHOFER, *Primary Examiner.*

JAMES A. SEIDLECK, *Examiner.*

M. B. KURTZMAN, *Assistant Examiner.*